US 9,983,826 B2

(12) United States Patent
Lang et al.

(10) Patent No.: US 9,983,826 B2
(45) Date of Patent: *May 29, 2018

(54) DATA STORAGE DEVICE DEFERRED SECURE DELETE (71) Applicant: International Business Machines Corporation, Armonk, NY (US)

(72) Inventors: Jakob C. Lang, Altdorf (DE); Angel Nunez Mencias, Stuttgart (DE); Thomas Pohl, Bempflingen (DE); Martin Troester, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/302,834

(22) Filed: Jun. 12, 2014

(65) Prior Publication Data
US 2015/0088858 A1    Mar. 26, 2015

Related U.S. Application Data (63) Continuation of application No. 14/036,421, filed on Sep. 25, 2013.

(51) Int. Cl.
*G06F 17/30* (2006.01)
*G06F 3/06* (2006.01)

(52) U.S. Cl.
CPC ............ *G06F 3/0652* (2013.01); *G06F 3/061* (2013.01); *G06F 3/0659* (2013.01); *G06F 3/0673* (2013.01); *G06F 17/30067* (2013.01); *G06F 17/30489* (2013.01)

(58) Field of Classification Search
None
See application file for complete search history.

(56) References Cited

U.S. PATENT DOCUMENTS

| | | | | |
|---|---|---|---|---|
| 6,070,174 | A * | 5/2000 | Starek | G06F 17/30117 |
| 6,343,378 | B1 * | 1/2002 | Moroda | G06F 8/54 |
| | | | | 717/162 |
| 7,895,403 | B1 | 2/2011 | Tormasov et al. | |
| 8,156,260 | B2 * | 4/2012 | Ogawa | G06F 13/28 |
| | | | | 710/22 |
| 9,111,621 | B2 | 8/2015 | Krutzik et al. | |

(Continued)

OTHER PUBLICATIONS

Gerbarg, L., "From write ( ) down to the flash chips", /dev/why!?!, Posted Aug. 4, 2009, Copyright © 2009 Louis Gerbarg. http://www.devwhy.com/blog/2009/8/4/from-write-down-to-the-flash-chips.html.

(Continued)

*Primary Examiner* — Albert Phillips, III
*Assistant Examiner* — Raheem Hoffler
(74) *Attorney, Agent, or Firm* — Leonard T. Guzman (57) ABSTRACT A method of securely deleting data from a data storage device is described. The method includes the steps of receiving a secure delete command to securely delete a file. A data block of the file to securely delete is identified. A pointer to the data block is stored in a deletion buffer. It is then determined whether the secure delete command has a highest priority over other data storage device commands. In response to the secure delete command having the highest priority, the secure delete command to the data block is performed.

9 Claims, 6 Drawing Sheets

(56) References Cited

U.S. PATENT DOCUMENTS

| | | | |
|---|---|---|---|
| 9,317,422 B1 | 4/2016 | Winters et al. | |
| 2006/0085493 A1* | 4/2006 | Kim | G06F 3/0608 |
| 2006/0117153 A1* | 6/2006 | Tran | G06F 3/0623 |
| | | | 711/159 |
| 2007/0101054 A1* | 5/2007 | Sivathanu | G06F 3/0623 |
| | | | 711/112 |
| 2009/0132760 A1* | 5/2009 | Flynn | G06F 1/183 |
| | | | 711/113 |
| 2010/0138619 A1 | 6/2010 | Benavides | |
| 2010/0274986 A1 | 10/2010 | Matsumoto | |
| 2011/0289267 A1* | 11/2011 | Flynn | G06F 1/183 |
| | | | 711/103 |
| 2012/0059976 A1 | 3/2012 | Rosenband et al. | |
| 2012/0059978 A1 | 3/2012 | Rosenband et al. | |
| 2012/0265926 A1 | 10/2012 | Tal et al. | |
| 2012/0311237 A1 | 12/2012 | Park | |
| 2013/0191601 A1* | 7/2013 | Peterson | G06F 12/0893 |
| | | | 711/137 |
| 2014/0195564 A1* | 7/2014 | Talagala | G06F 12/0804 |
| | | | 707/802 |
| 2014/0365743 A1 | 12/2014 | Pronozuk et al. | |
| 2015/0088838 A1* | 3/2015 | Lang | G06F 3/0652 |
| | | | 707/692 |

OTHER PUBLICATIONS

Hughes et al., "Secure Erase of Disk Drive Data", Tech Papers, 2002, Coughlin Associates. http://www.tomcoughlin.com/Techpapers/Secure%20Erase%20Article%20for%20IDEMA,%20042502.pdf.

"TRIM", Wikipedia the Free Encylopedia, http://de.wikipedia.org/wiki/TRIM.

Wei et al., "Reliably Erasing Data From Flash-Based Solid State Drives", FAST'11: Proceedings of the 9th USENIX Conference on File and Storage Technologies, Feb. 2011, USENIX Association, Berkeley, CA, © 2011. http://static.usenix.org/events/fast11/tech/full_papers/Wei.pdf.

Lang et al., "Data Storage Device Deferred Secure Delete", U.S. Appl. No. 14/036,421, filed Sep. 25, 2013.

\* cited by examiner

DATA STORAGE DEVICE DEFERRED SECURE DELETE

FIELD

This invention relates generally to secure deletion of data from a data storage device, and more particularly, to deferred secure deletion of data from data storage device with persistent storage.

BACKGROUND

Secondary data storage devices are in a number of devices such as personal computers, servers, cell phones, tablets, and gaming consoles to name a few. Some examples of data storage devices are hard disk drives (HDDs) and solid state drives (SSDs). These drives may have large capacities that may hold up to trillions of bits of data. Besides storing data on the data storage devices, data may be deleted when it is no longer needed, wanted, or when the storage capacity is needed for other data.

SUMMARY

In an embodiment, a method of securely deleting data from a data storage device is described. The method includes the steps of receiving a secure delete command to securely delete a file. A data block of the file to securely delete is identified. A pointer to the data block is stored in a deletion buffer. It is then determined whether the secure delete command has a highest priority over other data storage device commands. In response to the secure delete command having the highest priority, the secure delete command to the data block is performed.

In another embodiment, a data storage device is described. The data storage device includes a persistent storage, a deletion buffer to store a pointer to a data block, and a controller. The controller is configured to receive a secure delete command to securely delete a file. The controller is also configured to identify a data block of the file to securely delete and store a pointer to the data block in a deletion buffer. The controller determines whether the secure delete command has a highest priority over other data storage device commands. The controller performs the secure delete command to the data block in response to the secure delete command having the highest priority.

BRIEF DESCRIPTION OF THE DRAWINGS

Embodiments will be better understood from the following detailed description with reference to the drawings, in which.

DETAILED DESCRIPTION

Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of this invention as claimed. The same numbers may be used in the Figures and the Detailed Description to refer to the same devices, parts, components, steps, operations, and the like.

Data may be stored and deleted from data storage devices. Examples of data storage device may be hard disk drives (HDDs) and solid state drives (SSDs). When deleting data a user may indicate a file or content to delete at the application level or operating system (OS). When the file is deleted most OS will let the data storage device know not to maintain the file within a file system. The data is never actually physically removed from the data storage device but removed from the file system. The files system is essentially a database that organizes and manages the abstract files the user interacts with at the application level. Physical units or data on the data storage device make up the files. The files are usually separated into data blocks. Each data block may make up several thousand bytes of data. Each data block may be written to a physical address of the data storage device. The data blocks remain in the data storage device until the operating system reuses the space for new files. Even when undeleting has become impossible, the data blocks, until it has been overwritten or in many cases overwritten many times, may be read by software that reads disk sectors directly.

This becomes troublesome when trying to delete sensitive files so the data is unrecoverable. Secure deletion techniques are available when a user wants to permanently delete data. Some secure deletion techniques include: a secure deletion of the complete data storage device by the BIOS, degaussing (removal of a magnetic field of a disk or drive), and physical destruction of the data storage device. However, these secure deletion techniques are not ideal in a situation where a user wants to use a data storage device again or use other data on the data storage device. This is because these secure deletion techniques either destroy the data storage device or all of the data on the device is effectively removed.

Another secure delete technique is using a computer program to overwrite the data blocks that are to be deleted permanently with new data. Overwriting may include explicit secure deletion triggered by the user. Overwriting may be done to the data blocks marked as deleted by any overwriting technique such as writing over data blocks with all logical zeros, all logical ones, with random data, a combination of the overwriting techniques, or writing over the data block multiple times. However, due to the large number of times that the patterns of data have to be written onto the data storage device and the large number of I/O operations necessary, system performance may suffer. Even if the amount of overwrites is one per data block, system performance suffers. This is because overwriting may still be occurring when another command, with perhaps a higher priority, wants to perform read/write operations, which delays the execution of the higher priority command. In other situations, the secure delete overwriting commands may interweave with one or more other storage device commands which may slow performance of the other storage device.

Embodiments herein provide for a secure deletion method and data storage device. The secure deletion method and data storage device provide for deferred deletion being done when the data storage device is not performing a higher priority command. The deferred secure deletion may be done by buffering the secure deletion commands by the controller of the data storage device. If the deletion buffer is full, then the priority of the secure delete commands may be increased to at least the priority of other commands. Other embodiments may ensure the secure deletion takes place even when the data storage device goes offline such as when the power storage device loses connectivity either with the host or with a power source.

Figure 1:
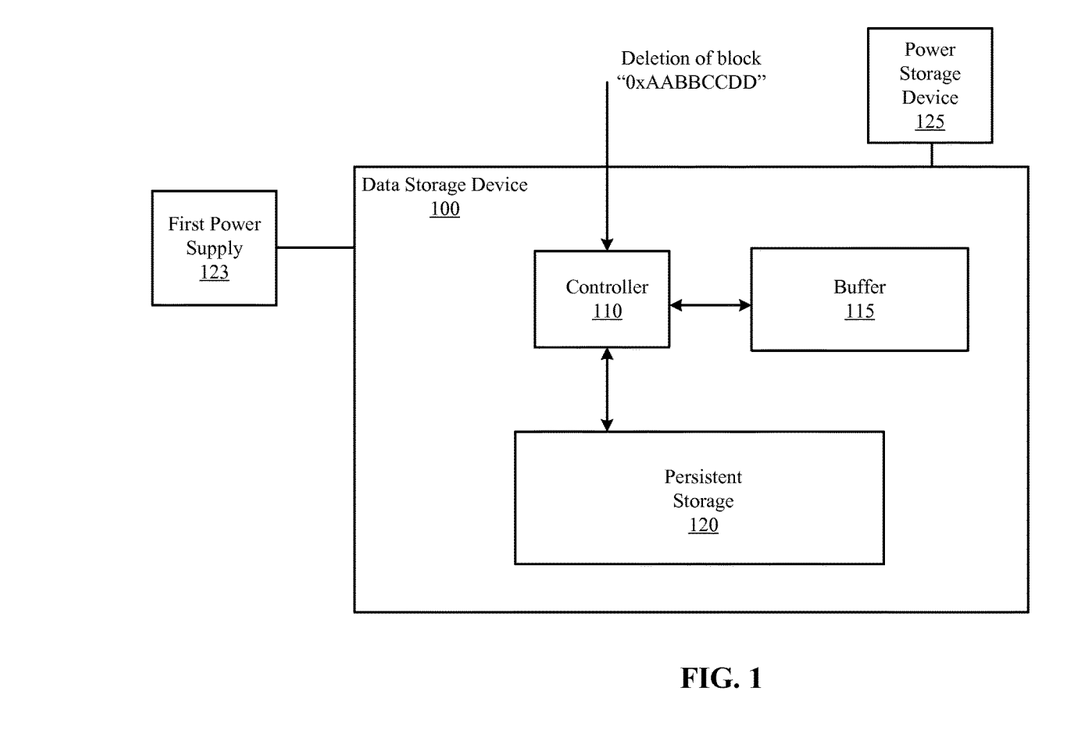
FIG. 1 illustrates a block diagram of components of a data storage device supporting deferred secure deletion, according to embodiments.

FIG. 1 illustrates a block diagram of components of a data storage device 100 supporting deferred secure deletion, according to embodiments. The data storage device 100 may include a controller 110, a deletion buffer 115, and persistent storage 120, e.g., HDD or SSD. The controller 110 may be in communication with the deletion buffer 115 and the persistent storage 120. The data storage device 100 may include a first power supply 123 that provides the data storage device 100 with its main power. The first power supply 123 may be drawn from a device using the data storage device 100. The data storage device 100 may also include a power storage device 125 that may be included within the data storage device 100 or external to the data storage device 100. The power storage device 125 may be referred to as a second power supply herein. The power storage device 125 may provide power to the data storage device 100 when the first power supply 123 to the data storage device 100 is offline. The power storage device 125 may be a battery, capacitor, or other device that may store power.

Generally, embodiments may provide for an operating system (OS) or an application layer identifying files to be securely deleted in a command. The secure delete command may be sent to a data storage device driver and the data storage device driver may send the secure delete command to the controller 110 on the data storage device 100. The controller 110 may receive the secure delete command. The controller 110 may determine one or more data blocks to delete. A content pointer for the data block may be pushed to the deletion buffer 115. If the data storage device 100 is not performing higher priority operations, then the secure delete command may occur. If higher priority operations begin again, then the secure delete may be paused. If the data storage device 100 loses power connection with the first power supply 123, then the deletion buffer 115 may be executed using power reserves in the power storage device 125. If the system goes offline, the buffered secure delete commands are assigned the highest priority. In an embodiment, if the delete buffer 115 is full and additional secure delete commands are pending, then the secure delete commands may become higher priority than other commands and be processed before the other commands. In other embodiments, the secure delete commands may be interweaved with the other commands. Assigning a higher priority to the secure delete operations may continue until the amount of secure deletion commands in the deletion buffer 115 reaches a maximum threshold. Using these embodiments may result in there being better performance of the data storage device 100.

There are several ways to implement the deferred secure deletion and data storage device 100. In an embodiment, an OS may support a deferred secure deletion with a data storage device driver that is modified to do secure deletes. In another embodiment, a host computer system with data storage device driver and file system support module may be used for deferred secure deletion. In yet another embodiment, the controller 110 may have support for the deferred secure deletion using a file system analyzer. The secure deletion may be implemented in different data storage devices 100 such as an HDD or an SSD.

Figure 2:
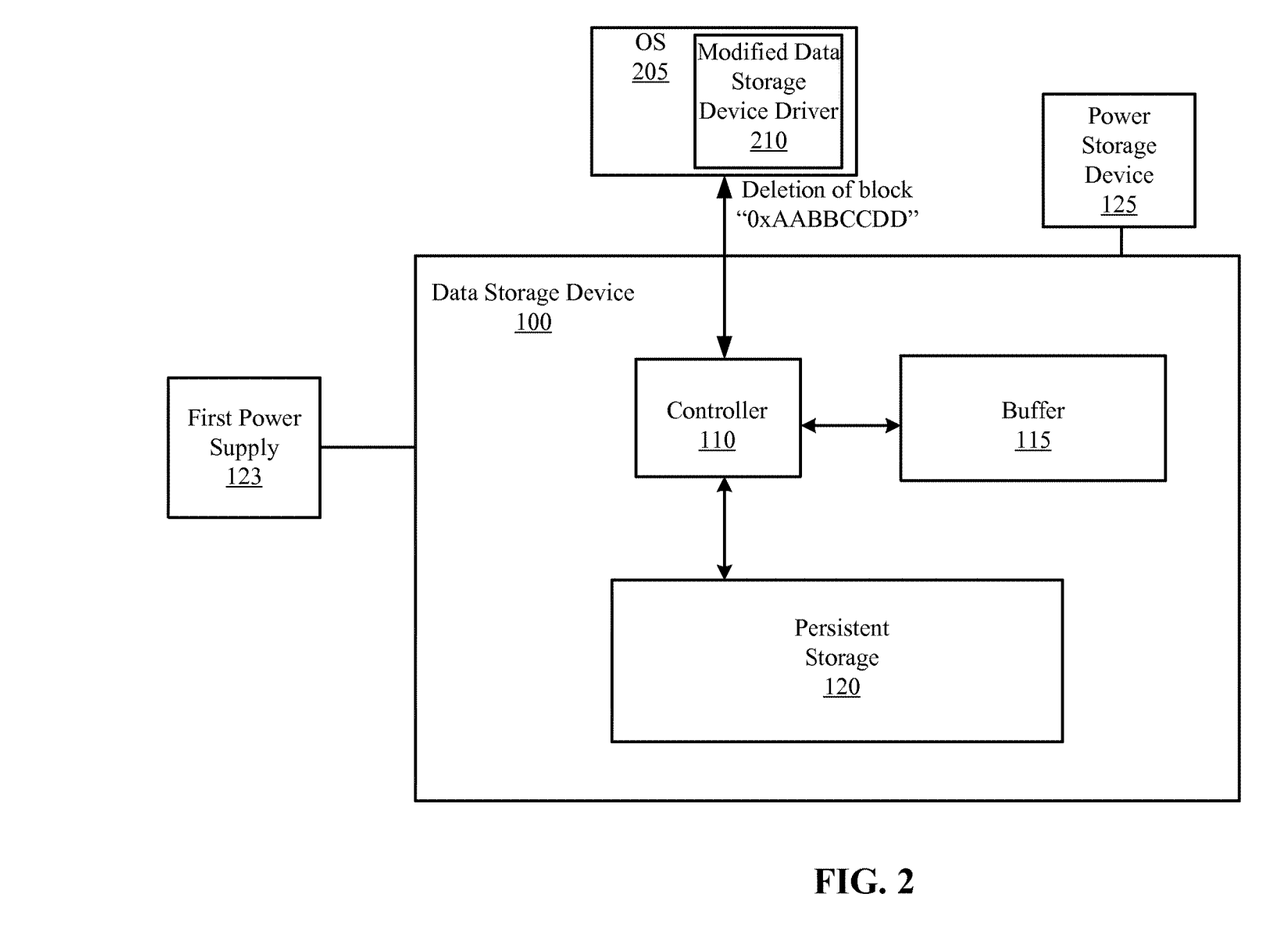
FIG. 2 illustrates a block diagram of the data storage device 100 where an operating system (OS) may be used to support a deferred secure deletion, according to an embodiment.

FIG. 2 illustrates a block diagram of the data storage device 100 where an operating system (OS) 205 may be used to support the deferred secure deletion, according to an embodiment. The data storage device 100 in this example may be an HDD. The data storage device 100 may include the controller 110, the deletion buffer 115, and the persistent storage 120. The controller 110 may be in communication with the deletion buffer 115 and the persistent storage 120. The data storage device 100 may include a first power supply 123 that provides the data storage device 100 with its main power. The first power supply 123 may be drawn from a device using the data storage device 100. The data storage device 100 may also include a power storage device 125 that may be included within the data storage device 100 or external to the data storage device 100. The power storage device 125 may provide power to the data storage device 100 when the first power supply 123 to the data storage device 100 is offline. An OS 205 having a data storage device driver 210 may be in communication with the controller 110.

In the embodiment illustrated in FIG. 2, the OS 205 may identify files to delete. The OS 205 may send a secure delete command to the data storage device driver 210 that includes the files to delete. The data storage device driver 210 may be modified to issue automatic or implicit secure delete commands. The data storage device driver 210 may send the secure delete command to the data storage device 100 along with the file to delete based on the content identified by the OS 205. The controller 110 of the data storage device 100 may identify one or more addresses of data blocks of the file to delete from the secure delete command and the identified file to delete. The controller 110 may push a content pointer of the addresses of the one or more data blocks to be deleted to the deletion buffer 115.

If the deletion buffer 115 is full, then the controller 110 may switch to a non-deferred deletion mode instead of a deferred deletion mode until space has been made in the deletion buffer. In a non-deferred deletion mode, the secure delete commands may receive a priority to at least that of other data storage commands. Therefore the, secure delete commands may interweave or be treated in a first in first out manner in relation to other data storage commands given to the data storage device 100. In another embodiment, the controller 110 may issue an error when the deletion buffer 115 is full to the OS 205 and the user may have to try to delete the files at a later time. In another embodiment, the secure delete commands to the data storage device 110 from the OS 205 may be slowed or stopped until space in the deletion buffer 115 is available.

Otherwise, if the deletion buffer 115 is not full, then the deferred secure deletion commands may be executed while the data storage device 100 is not running higher priority storage device commands, e.g., if no Advanced Technology Attachment (ATA) command is pending, or while the data storage device 100 is not receiving power from the first power supply 123. In the deferred secure deletion as well as the non-deferred secure deletion, the controller 110 may use a secure deletion technique on the one or more data blocks identified by the content pointers stored in the deletion buffer 115. The secure delete may be done by any secure delete technique such as writing over the data blocks once or repeatedly with all logical zeros, all logical ones, with random data or a combination of the techniques.

Figure 3:
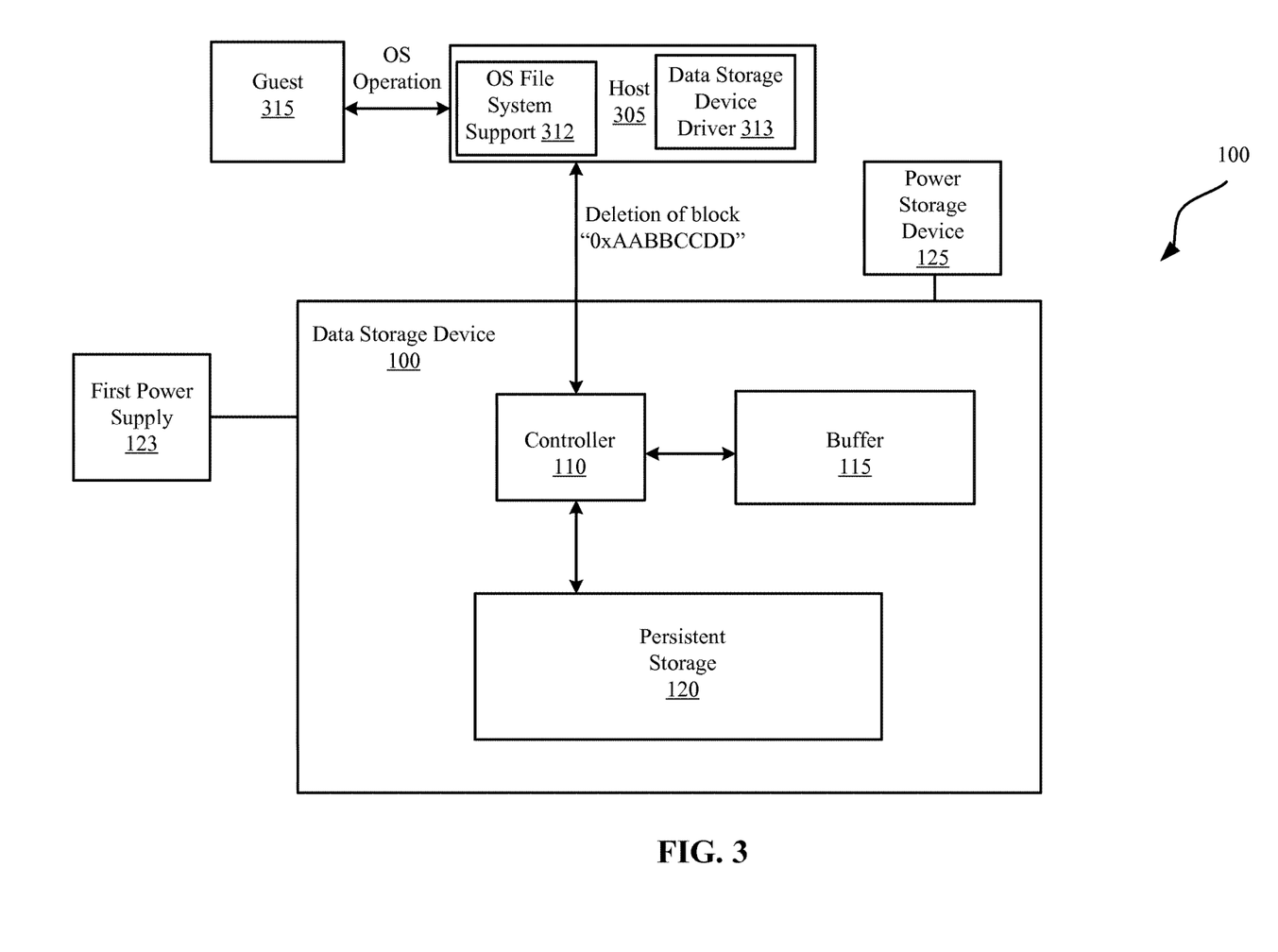
FIG. 3 illustrates a block diagram of the data storage device where a host computer system may be used to support a deferred secure deletion for an emulated guest computer system, according to an embodiment.

FIG. 3 illustrates a block diagram of the data storage device for deferred secure deletion with emulation, according to an embodiment. A host computer system 305 may emulate a guest computer system 315. The data storage device 100 in this example may be an HDD. The data storage device 100 may include the controller 110, the deletion buffer 115, and the persistent storage 120. The controller 110 may be in communication with the deletion buffer 115 and the persistent storage 120. The data storage device 100 may include the first power supply 123 that provides the data storage device 100 with its main power. The first power supply 123 may be drawn from a device using the data storage device 100. The data storage device 100 may also include the power storage device 125 that may be included within the data storage device 100 or external to the data storage device 100. The power storage device 125 may provide power to the data storage device 100 when the first power supply 123 to the data storage device 100 is offline.

The host computer system 305 may include an OS file system support module 312. The host computer system 305 may be in communication with the data storage device 100. The host computer system 305 may be in communication with the guest computer system 315. The guest computer system 315 may be a virtual workload on the host computer system 305. A virtual machine (VM) typically has two components: the host and the guest. The host is the virtual machine host server; the underlying hardware that provides computing resources, such as processing power, memory, disk and network I/O, and so on. The guest is a completely separate and independent instance of an operating system and application software. Guests are the virtual workloads that reside on a host virtual machine and share in that host's computing resources.

In the embodiment illustrated in FIG. 3, an operating system of the guest computer system 315 may identify a file to delete. The guest computer system 315 may send a secure delete command to the OS file system support module 312 of the host computer system 305. The secure delete command may include the file to delete. The OS file system support module 312 may keep track of the addresses of the data blocks of the file are no longer used in a file system of the OS of the guest 315. The OS file system support module 312 may forward the secure delete command and the address of the data block to be securely deleted to a data storage device driver 313. The data storage device driver 313 may be modified to perform an automatic or implicit secure delete command. The data storage device driver 313 may send the secure delete command to the data storage device 100 along with the address of one or more data blocks to securely delete. The controller 110 of the data storage device 100 may identify the data blocks to securely delete based on the secure delete command and addresses identifying the data blocks. The controller 110 may then push a content pointer of the address of the one or more data blocks to be securely deleted to the deletion buffer 115.

If the deletion buffer 115 is full, then the controller 110 may switch to a non-deferred deletion mode instead of a deferred deletion mode until space has been made in the deletion buffer. In a non-deferred deletion mode, the secure delete commands may receive a priority to at least that of other data storage commands. Therefore the, secure delete commands may interweave or be treated in a first in first out manner in relation to other data storage commands given to the data storage device 100. In another embodiment, the controller 110 may issue an error when the deletion buffer 115 is full to the data storage device driver 313, which may handle the error. The data storage device driver 313 may block other Advance Technology Attachment (ATA) commands and re-issue the secure delete that failed to ensure that no deletion command is lost in a sudden power-off. In another embodiment, the secure delete commands to the data storage device 110 from the OS 305 may be slowed or stopped until space in the deletion buffer 115 is available.

Otherwise, if the deletion buffer 115 is not full, then the deferred secure deletion commands may be executed while the data storage device 100 is not running higher priority storage device commands, e.g., if no Advanced Technology Attachment (ATA) command is pending, or while the data storage device 100 is not receiving power from the first power supply 123. In the deferred secure deletion as well as the non-deferred secure deletion, the controller 110 may use a secure deletion technique on the one or more data blocks identified by the content pointers stored in the deletion buffer 115. The secure delete may be done by any secure delete technique such as writing over the data blocks once or repeatedly with all logical zeros, all logical ones, with random data or a combination of the techniques.

Figure 4:
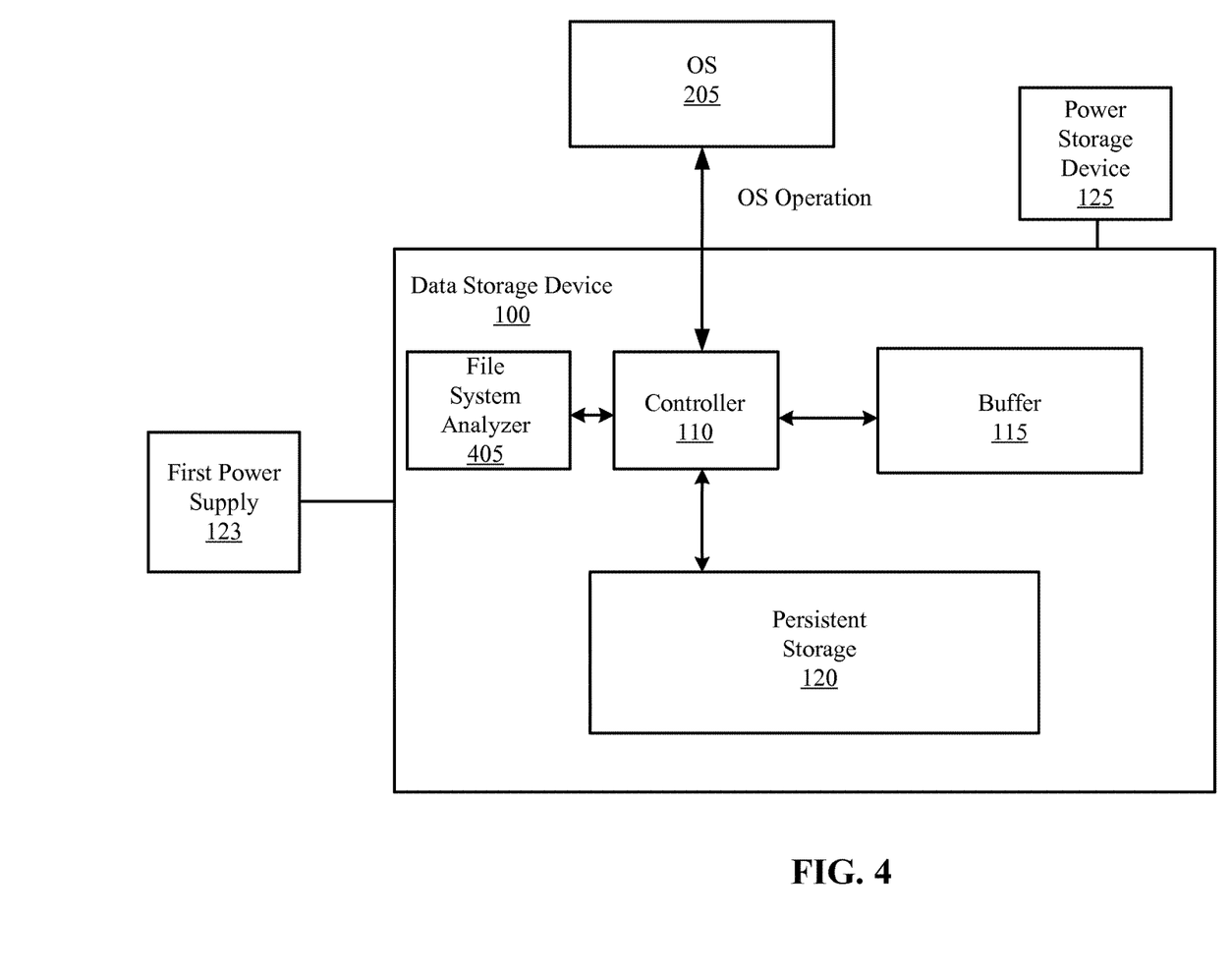
FIG. 4 illustrates a block diagram of the data storage device where a controller may be used to support a deferred secure deletion, according to an embodiment.

FIG. 4 illustrates a block diagram of the data storage device 100 where a controller 110 may be used to support a deferred secure deletion, according to an embodiment. The data storage device 100, in this example, may be an HDD. The data storage device 100 may include the controller 110, the deletion buffer 115, and the persistent storage 120. The controller 110 may be in communication with the deletion buffer 115 and the persistent storage 120. The data storage device 100 may include the first power supply 123 that provides the data storage device 100 with its main power. The first power supply 123 may be drawn from a device using the data storage device 100. The data storage device 100 may also include the power storage device 125 that may be included within the data storage device 100 or external to the data storage device 100. The power storage device 125 may provide power to the data storage device 100 when the first power supply 123 to the data storage device 100 is offline. The data storage device 100 may also include a file system analyzer 405 in communication with the controller 110.

In the embodiment illustrated in FIG. 4, the file system analyzer 405 may be used with the controller 110 to accomplish the deferred secure deletion. The OS 205 may identify content to delete. The OS 205 may send a command to the controller 110 of the data storage device 100 along with the content to delete. The controller 110 may have a file system with the addresses of data blocks stored in the persistent storage 120. The files to delete may be deleted from the file system. The data storage device 100 may include the file system analyzer 405. The file system analyzer 405 may analyze the file system in the controller 110 to determine the addresses of what data blocks are not in use. Based on the addresses of the data blocks not in use the file system analyzer 405 may signal the controller 110 the addresses of the data blocks needing a secure deletion. The controller 110 may then push a content pointer of the addresses of the data blocks to be deleted to the deletion buffer 115.

If the deletion buffer 115 is full, then the controller 110 may switch to a non-deferred deletion mode instead of a deferred deletion mode until space has been made in the deletion buffer. In a non-deferred deletion mode, the secure delete commands may receive a priority to at least that of other data storage commands. Therefore the, secure delete commands may interweave or be treated in a first in first out manner in relation to other data storage commands given to the data storage device 100. In another embodiment, the controller 110 may issue an error when the deletion buffer 115 is full to the file system analyzer 405 which may handle the error. The data storage device driver 313 may block other ATA commands and re-issue the secure delete that failed to ensure that no deletion command is lost in a sudden power-off. In another embodiment, the secure delete commands to the data storage device 110 from the OS 205 may be slowed or stopped until space in the deletion buffer 115 is available.

Otherwise, if the deletion buffer 115 is not full, then the deferred secure deletion commands may be executed while the data storage device 100 is not running higher priority storage device commands, e.g., if no Advanced Technology Attachment (ATA) command is pending, or while the data storage device 100 is not receiving power from the first power supply 123. In the deferred secure deletion as well as the non-deferred secure deletion, the controller 110 may use a secure deletion technique on the one or more data blocks identified by the content pointers stored in the deletion buffer 115. The secure delete may be done by any secure delete technique such as writing over the data blocks once or repeatedly with all logical zeros, all logical ones, with random data or a combination of the techniques.

Figure 5:
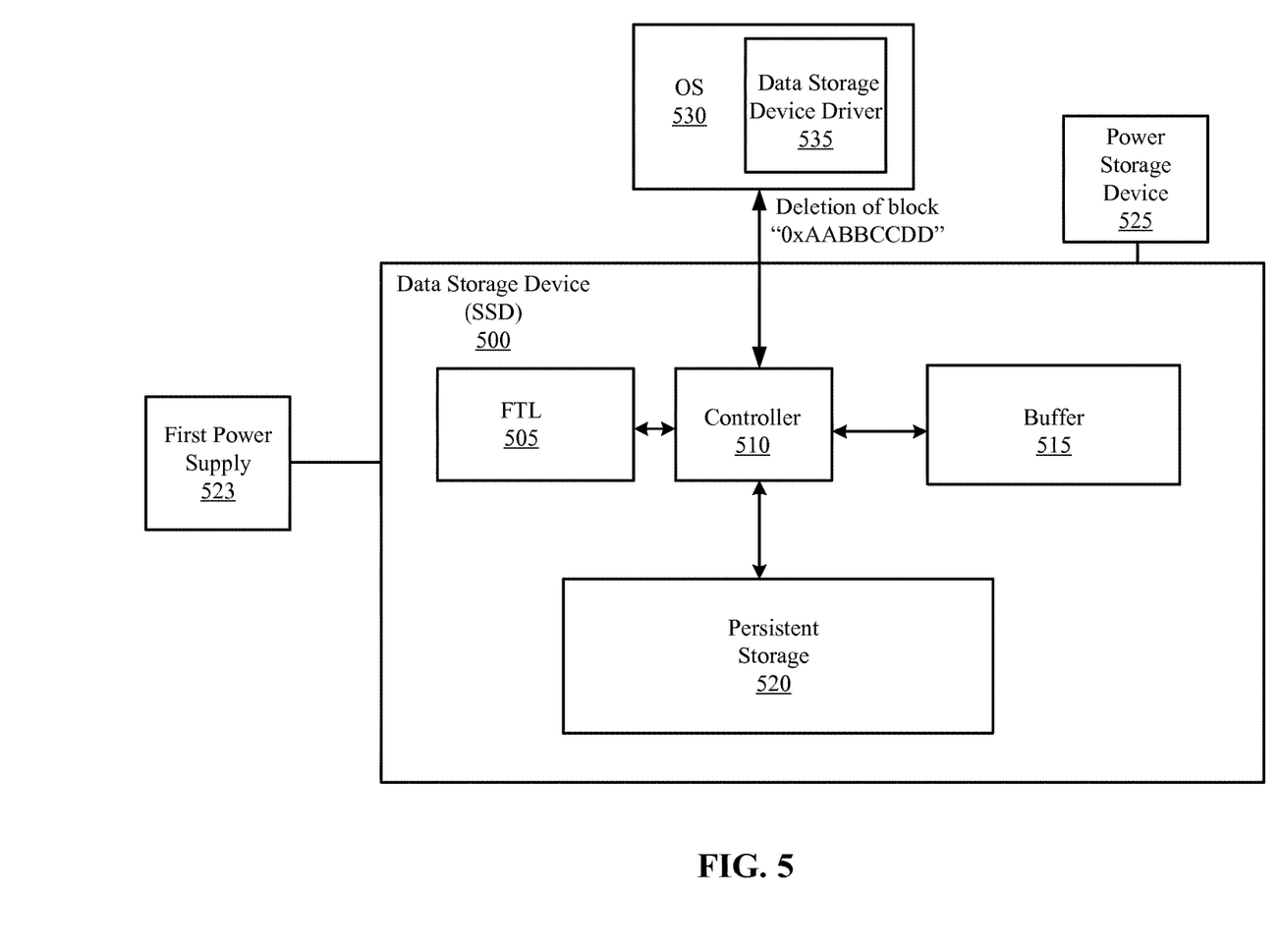
FIG. 5 illustrates a block diagram of the data storage device where the data storage device is a solid state drive (SSD), according to an embodiment.

FIG. 5 illustrates a block diagram of a data storage device 500 where the data storage device is a solid state drive (SSD), according to an embodiment. The data storage device 500 may include the controller 510, the deletion buffer 515, and the persistent storage 520. The persistent storage 520 may be solid state memory. The data storage device 500 may include the first power supply 523 that provides the data storage device 500 with its main power. The first power supply 523 may be drawn from a device using the data storage device 500. The data storage device 500 may also include the power storage device 525 that may be included within the data storage device 500 or external to the data storage device 500. The power storage device 525 may provide power to the data storage device 500 when the first power supply 523 to the data storage device 500 is offline. The controller 510 may be in communication with the deletion buffer 515 and the persistent storage 520. The controller 510 may also be in communication with the operating system 530. The operating system 530 may have a data storage device driver 535. The data storage device driver 535 may be a modified SSD driver that may support a secure delete operation. The data storage device 500 may also include a FLASH translation layer (FTL) 505. The FTL may be used to map logical addresses into FLASH memory physical addresses. The FTL may include software as well as translation tables.

For a data storage device 500 that is an SSD, the usual handling for the data storage devices that are HDD does not work. This is because the data is always written to different pages for each write command (same block) due to performance and degradation of FLASH cells. Also, the OS 530 writing zeros to a file does not eliminate the data physically on the device. Furthermore, a SSD TRIM command does not delete the data either: it just lets the controller know that the data is not needed anymore and the pages behind can be reused. Deletion is not guaranteed.

In the embodiment illustrated in FIG. 5, the deferred secure deletion of data in an SSD may begin with the operating system (OS) 530 identifying content to delete. The OS 530 may send a command to the data storage device driver 535 of the files to be deleted. The data storage device driver 535 may send a TRIM command to the data storage device 500. The controller 510 of the data storage device 500 may identify one or more data blocks to securely delete based on the TRIM command and content to securely delete. The controller 510 may lookup the page for the block in the FTL 505. The controller 510 may then push a page pointer of the addresses of one or more data blocks to be securely deleted to the deletion buffer 515.

If the deletion buffer 515 is full, then the controller 510 may switch to a non-deferred deletion mode instead of a deferred deletion mode until space has been made in the deletion buffer. In a non-deferred deletion mode, the secure delete commands may receive a priority to at least that of other data storage commands. Therefore, the secure delete commands may interweave or be treated in a first in first out manner in relation to other data storage commands given to the data storage device 500. In another embodiment, the controller 510 may issue an error when the deletion buffer 515 is full to the OS 530 and the user may have to try to delete the files at a later time. In another embodiment, the secure delete commands to the data storage device 510 from the OS 530 may be slowed or stopped until space in the deletion buffer 515 is available.

Otherwise, if the deletion buffer 515 is not full, then the deferred secure deletion commands may be executed while the data storage device 500 is not running higher priority storage device commands, e.g., if no Advanced Technology Attachment (ATA) command is pending, or while the data storage device 500 is not receiving power from the first power supply 523. In the deferred secure deletion as well as the non-deferred secure deletion, the controller 510 may use a secure deletion technique on the one or more data blocks identified by the content pointers stored in the deletion buffer 515. The secure delete may be done by any secure delete technique such as repeatedly writing over the data blocks with all logical zeros, all logical ones, with random data or a combination of the techniques.

Also, when the data storage device 500 is an SSD, the write behavior of the SSD may need to be changed as well because the data is always written to different pages for each write command due to performance and wear leveling of flash cells. The OS 530 may identify content to write. The OS 530 may send a write command to the data storage device driver 535. The data storage device driver 535 may send a write command to the data storage device 500. The controller 510 may identify blocks and page to which to write the data. The controller 510 may be modified to consider that the pages in the delete buffer 515 are not eligible for this. This is because if a page gets overwritten data from a write command after the TRIM command removes the page from a file system but before a secure delete occurs, then when the secure delete occurs, the secure delete will overwrite the new data not knowing that the old data was previously overwritten with a write command. Not only is there a possibility of overwriting new data with a secure delete but when writing data over existing data instead of an empty page may create additional overhead and use additional resources in an SSD unlike HDDs. The deletion buffer 515, controller 510, and FTL 505 may use the deletion buffer 515 to track which secure deletes have not yet taken place. The secure delete may create an empty page and also direct the write commands to write only to empty pages to limit performance issues.

In the embodiments described for FIG. 2-FIG. 5, the data storage device 100 and 500 may include the power storage device 125. The power storage device 125 may provide power to the data storage device 100 when the first power supply 123 is offline. The power storage device 125 may be a capacitor or a battery. The power storage device 125 may have enough power to delete all of the data blocks in the delete buffer 115, 515 when there is a power loss scenario such as when the first power supply 123 is offline. The amount of power required to delete one data block may be data storage device specific, which includes the basic operation power e.g., controller, rotating disks. The amount of power required to delete one block may be referred to as a deletion power unit (dpu). The amount of power stored in the power storage devices 125, 525 may need to be the dpu multiplied by a desired buffer size, e.g. 100 blocks. Upon startup of the data storage device 100, 500, the controller 110, 510 may check the available power storage capacity level. Depending on the level of power, the controller 110, 510 may limit the buffer size to the maximum number of blocks that can be securely deleted for available power. For instance, if the capacity of the power storage device 125 is 50% of the maximum capacity, then the controller may reduce the buffer size to 50%. In an embodiment, if the system goes offline, the buffered secure delete commands are assigned the highest priority. In another embodiment, secure delete commands may not have a priority.

In an embodiment, the deletion buffer 115, 515 may contain a list of data blocks as a linked list. The controller 110, 510 may use a first in first out approach to process the buffer content and so overwrite the data blocks.

In other embodiments, the command sent by the OS 205 may be a TRIM command. Although typically used in SSD data storage devices, the data storage device drivers 210, 313, the OS file system support module 312, and file system analyzers 405 may be modified to handle TRIM commands for HDD data storage devices 100. The OS 205 may identify content to delete. The data storage device driver 210, 313 may identify data blocks from inodes. An inode is an index node that is a data structure in a file system that stores all of the information about a file system object such as a file. The inode may contain pointers of data blocks. The TRIM command may be sent to the HDD data storage device with a list of the data blocks. Here, the controller 110 may push a content pointer with the address of the data blocks to the deletion buffer 115 for the data blocks identified.

Figure 6:
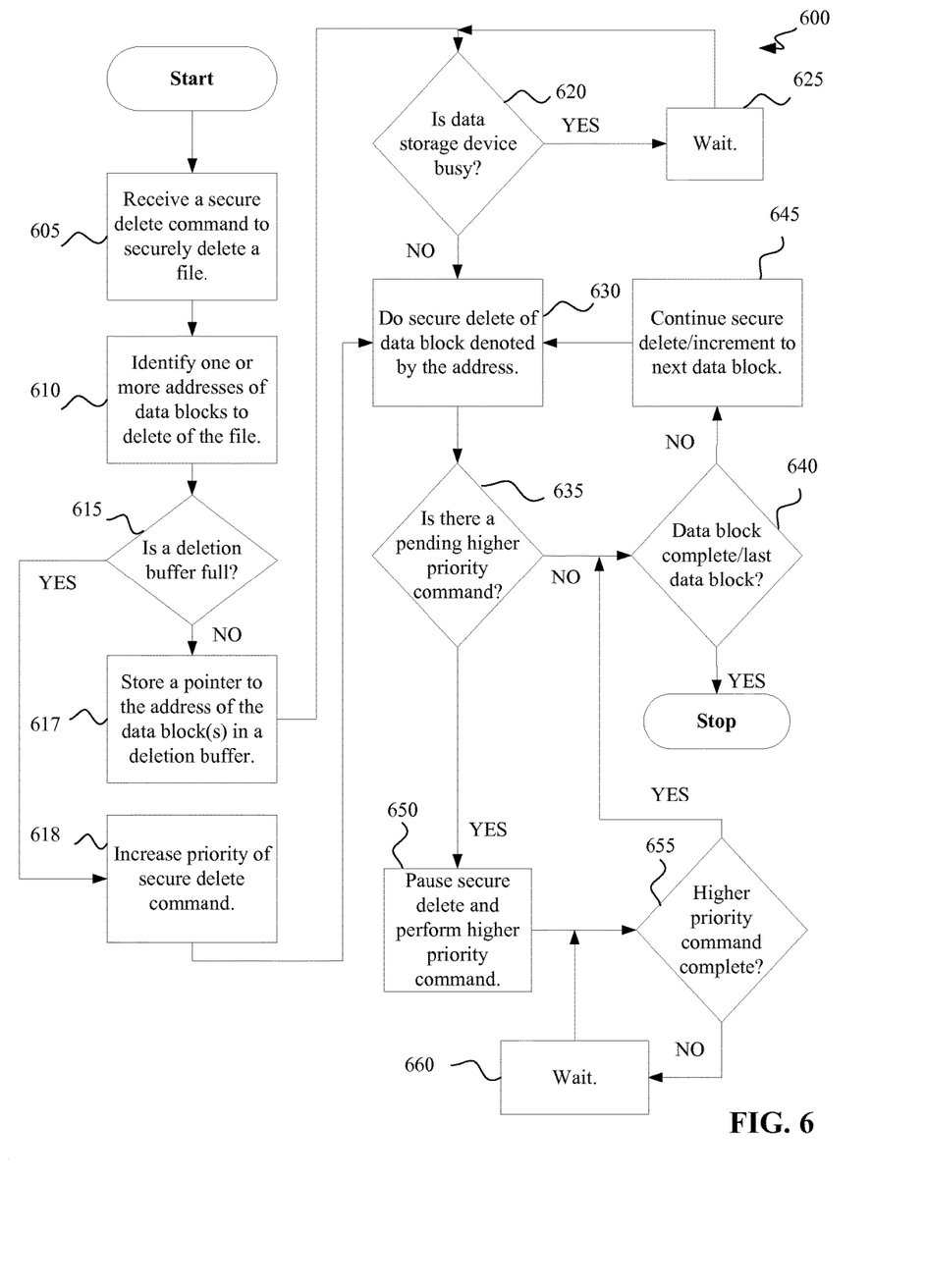
FIG. 6 illustrates a flow chart of a method of a deferred secure deletion on a data storage device, according to an embodiment.

FIG. 6 illustrates a flow chart of a method 600 of a deferred secure deletion of data blocks from a data storage device e.g. HDD or SSD. In operation 605, the data storage device may receive a secure delete command to securely delete a file. In operation 610, the data storage device may identify the one or more data blocks to securely delete based on the file identified In operation 615, the controller of the data storage device may determine whether a deletion buffer is deemed/considered "full," i.e., reached maximum buffer size. The deletion buffer may be full either because it has no more space left or because the number of secure delete commands has reached the maximum number of secure delete commands that may be performed successfully by a secondary power storage device should the data storage device go offline. If the deletion buffer is not full, then the method 600 may continue to operation 617, where the data storage device may try to store one or more pointers to the one or more data blocks in the deletion buffer. The pointer may include the addresses of the one or more data blocks in the physical memory.

In operation 620 the controller may determine whether the data storage device is busy with other data storage device commands to a persistent storage. If the data storage device is busy, then the controller may wait a defined period of time in operation 625 before determining whether or not the data storage device is busy. Once the data storage device is not busy with a read or write operation, then, in operation 630, a secure delete of the data block denoted by the address may begin. Returning to operation 617, if the deletion buffer is full, then, in operation 618, the priority of the secure delete command may be increased to at least the priority of other data storage device commands or to a higher priority. From operation 618, the method 600 may continue on to operation 630 and perform the secure delete of the data block.

In operation 635, the controller may determine whether there are any other data storage device operations that have a higher priority than the current secure delete command being executed. If there are no other pending higher priority data storage device commands, then, in operation 640, it may be determined whether the secure delete of the data bock has completed and if the data block has completed whether it is the last data block. If the secure delete of the data block has completed and the data block was the last data block pointed to in the deletion buffer, then the method 600 may stop. If the data block has not finished being securely deleted or it is not the last data block to be securely deleted, then, in operation 645, the secure delete of the data block may continue back to operation 630 or the next data block may begin the secure delete.

If, in operation 635, the controller determines there is a higher priority data storage device command for the data storage device to perform than the secure delete commands, then, in operation 650, the secure delete may be paused and the higher priority data storage device commands may be performed. In operation 655, it may be determined whether the higher priority data storage device command has been completed. If the data storage device command has not been completed the controller may wait in operation 660 before performing operation 655 again. The controller may wait for a predetermined time. If, in operation 655, the data storage device command has completed, then the method may return to operation 640.

While the invention has been described with reference to specific embodiments thereof, those skilled in the art will be able to make various modifications to the described embodiments without departing from the true spirit and scope of the embodiments. The terms and descriptions used herein are set forth by way of illustration only and are not meant as limitations. Those skilled in the art will recognize that these and other variations are possible within the spirit and scope of the embodiments as defined in the following claims and their equivalents.

What is claimed is:

1. A method of securely deleting a file from a data storage device having a persistent storage, comprising:
   receiving a secure delete command to securely delete data of a file;
   identifying a data block of the file to securely delete;
   storing a pointer to the data block in a deletion buffer, the pointer including an address of the data block in the persistent storage;
   determining whether the secure delete command has a highest priority over other data storage device commands;
   performing the secure delete command to the data block in response to the secure delete command having the highest priority, wherein the secure delete command causes the data to be deleted to be overwritten two or more times;

pausing the secure delete command in response to the secure delete command not having the highest priority;

determining whether the deletion buffer has reached a maximum buffer size, wherein the deletion buffer has reached the maximum buffer size if a number of secure delete commands has reached a maximum number of secure delete commands that may be performed successfully by a secondary power storage device should the data storage device go offline; and performing the secure delete command to the data block in response to determining the deletion buffer has reached the maximum buffer size.

2. The method of claim 1, further comprising:

storing the pointer to the data block in the deletion buffer in response to determining that the secure delete command does not have the highest priority.

3. The method of claim 2, further comprising:

determining whether a first power supply is supplying power to the data storage device; and performing the secure delete command on a data block having a pointer stored in the deletion buffer in response to determining that the first power supply is not supplying power to the data storage device, wherein the secure delete command is performed using power of a second power supply.

4. The method of claim 3, further comprising:

determining a power capacity of the second power supply; and setting the deletion buffer capacity to a size where the power capacity of the second power supply is sufficient to perform the secure delete command on data blocks identified by one or more pointers in the deletion buffer when the first power supply is not providing power.

5. The method of claim 3, wherein the second power supply is a power storage device, the power storage device being one of a battery or a capacitor.

6. The method of claim 3, wherein the secure delete command in the buffer is given the highest priority over the other data storage device commands.

7. The method of claim 1, wherein the data storage device is a hard disk drive (HDD).

8. The method of claim 1, wherein the data storage device is a solid state drive (SSD).

9. The method of claim 1, wherein the secured delete command causes the data to be deleted to be overwritten two or more times with all logical zeros, all logical ones, random data, or a combination of all logical zeros, all logical ones, and random data.

* * * * *